(12) United States Patent
Kim

(10) Patent No.: US 11,507,501 B2
(45) Date of Patent: Nov. 22, 2022

(54) APPARATUS AND METHOD FOR TRANSMITTING, BASED ON ASSIGNMENT OF BLOCK TO HPB REGION, METADATA GENERATED BY A NON-VOLATILE MEMORY SYSTEM

(71) Applicant: SK hynix Inc., Gyeonggi-do (KR)

(72) Inventor: Ki Young Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/384,543

(22) Filed: Jul. 23, 2021

(65) Prior Publication Data

US 2022/0197509 A1  Jun. 23, 2022

(30) Foreign Application Priority Data

Dec. 22, 2020  (KR) ........................ 10-2020-0180783

(51) Int. Cl.
*G06F 12/02* (2006.01)

(52) U.S. Cl.
CPC .. *G06F 12/0246* (2013.01); *G06F 2212/7201* (2013.01); *G06F 2212/7205* (2013.01)

(58) Field of Classification Search
CPC ........... G06F 12/0866; G06F 2212/311; G06F 2212/7201; G06F 12/0246; G06F 2212/7205
See application file for complete search history.

(56) References Cited

U.S. PATENT DOCUMENTS

| 9,727,249 B1* | 8/2017 | Subramanian ...... G11C 11/5621 |
| 10,229,051 B2 | 3/2019 | Hwang et al. |
| 2011/0191628 A1* | 8/2011 | Noguchi ................. G06F 11/16 |
| | | 714/E11.062 |
| 2020/0125295 A1 | 4/2020 | Jean |
| 2021/0034514 A1* | 2/2021 | Cho .................... G06F 12/0873 |

FOREIGN PATENT DOCUMENTS

KR  10-2020-0116704 A  10/2020

OTHER PUBLICATIONS

Universal Flash Storage (UFS) Host Performance Booster(HPB) Extension, JEDEC Standard No. 220-3, Jan. 2020, Version 1.0, Jedec Solid State Technology Association.

* cited by examiner

*Primary Examiner* — Chie Yew
(74) *Attorney, Agent, or Firm* — IP & T Group LLP

(57) ABSTRACT

A memory system includes a memory device including memory blocks, each memory block including a memory cell capable of storing a multi-bit data item. The memory device includes a write booster region including at least one memory block among the plurality of memory blocks, the at least one memory block including a memory cell storing a single-bit data item. A controller is configured to assign a memory block in the write booster region to a host performance booster (HPB) region when the memory block is closed and transmit to a host an indication that the memory block is assigned to the HPB region.

20 Claims, 8 Drawing Sheets

Case 1 : L2P cache miss

Case 2 : L2P cache hit

Case 3 : HPB L2P cache hit

APPARATUS AND METHOD FOR TRANSMITTING, BASED ON ASSIGNMENT OF BLOCK TO HPB REGION, METADATA GENERATED BY A NON-VOLATILE MEMORY SYSTEM

CROSS-REFERENCE TO RELATED APPLICATIONS

This patent application claims to the benefit of Korean Patent Application No. 10-2020-0180783, filed on Dec. 22, 2020, the entire disclosure of which is incorporated herein by reference.

TECHNICAL FIELD

One or more embodiments described in this disclosure relate to a memory system capable of transmitting meta data to an external device coupled to the memory system.

BACKGROUND

Many portable devices have a semiconductor memory for storing data. Semiconductor memories have proven to be beneficial for some applications because of their improved stability and durability, e.g., unlike a hard disk, a semiconductor memory has no mechanical driving parts (e.g., a mechanical arm). Semiconductor memories also comparably high data access speeds and low power consumption. Examples of semiconductor memories include a USB (Universal Serial Bus) memory device, a memory card having various interfaces, and a solid state drive (SSD).

BRIEF DESCRIPTION OF THE DRAWINGS

The description herein references the accompanying drawings where like reference numerals refer to like parts throughout the figures.

DETAILED DESCRIPTION

Figure 1:
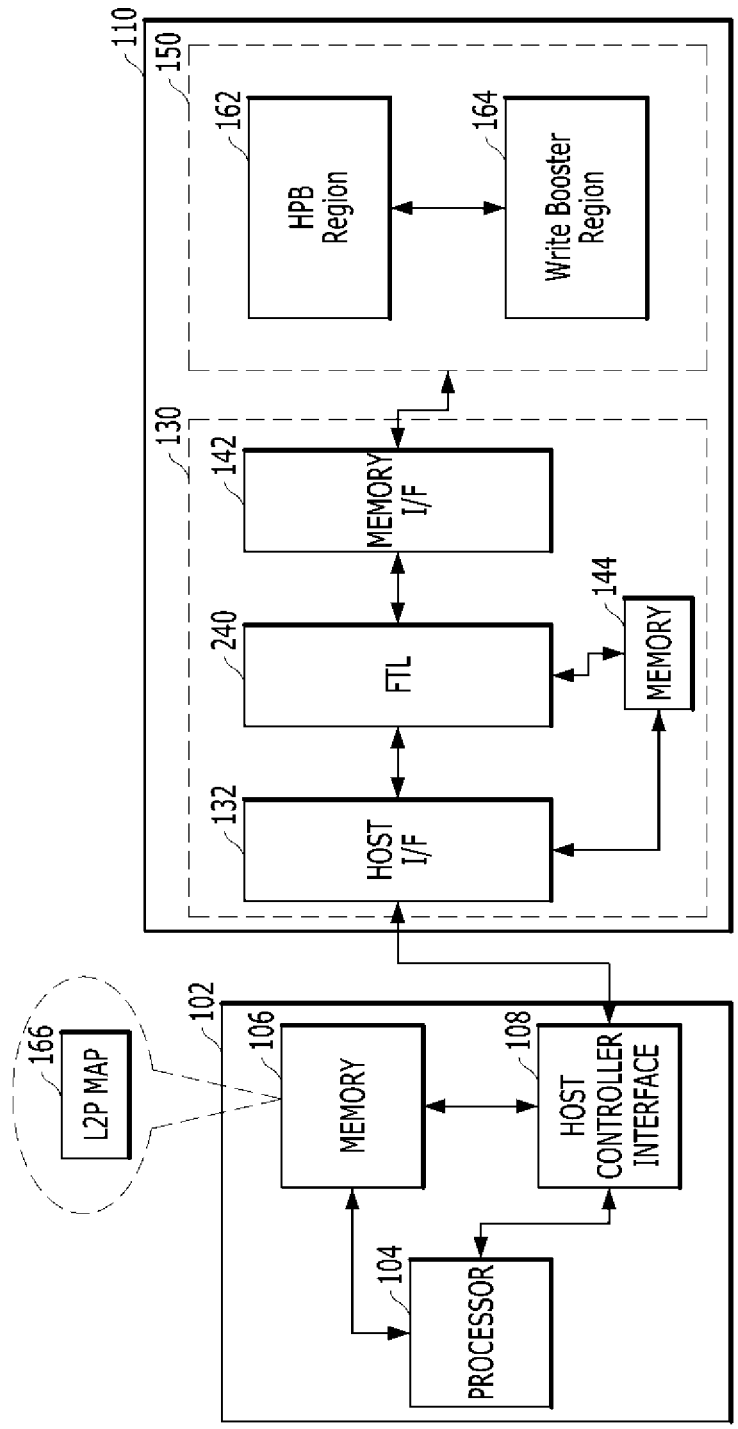
FIG. 1 illustrates an embodiment of a data processing system.

Various embodiments of the disclosed technology are described with reference to the accompanying drawings. Elements and features of the disclosed technology, however, may be configured or arranged differently to form other embodiments, which may be variations of any of the disclosed embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

In this disclosure, the terms "comprise," "comprising," "include" and "including" are open-ended. As used in the appended claims, these terms specify the presence of the stated elements and do not preclude the presence or addition of one or more other elements. The terms in a claim does not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

In an implementation of the disclosed disclosure, the term 'circuitry' refers to at least one of the following: (a) hardware-only circuit implementations (such as implementations in only analog and/or digital circuitry), (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions), or (c) to circuits, such as a microprocessor(s) or a portion of a microprocessor(s), that require software or firmware for operation, even if the software or firmware is not physically present. This definition of 'circuitry' applies to all uses of this term in this application, including in any claims. In an implementation, the term "circuitry" also covers an implementation of merely a processor (or multiple processors) or portion of a processor and its (or their) accompanying software and/or firmware. The term "circuitry" also covers, for example, an integrated circuit for a storage device.

As used herein, these terms are used as labels for nouns that they precede, and do not imply any type of ordering (e.g., spatial, temporal, logical, etc.). The terms "first" and "second" do not necessarily imply that the first value must be written before the second value. Further, although the terms "first", "second", "third", and so on may be used herein to identify various elements, these elements are not limited by these terms. These terms are used to distinguish one element from another element that otherwise have the same or similar names. For example, a first circuitry may be distinguished from a second circuitry.

Herein, an item of data or a data item may be a sequence of bits. For example, the data item may include the contents of a file, a portion of the file, a page in memory, an object in an object-oriented program, a digital message, a digital scanned image, a part of a video or audio signal, or any other entity which can be represented by a sequence of bits. According to an embodiment, the data item may include a discrete object. According to another embodiment, the data item may include a unit of information within a transmission packet between two different components.

Also, the term "based on" may describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose determination of A from also being based on C. In other instances, A may be determined based solely on B.

An embodiment described in this disclosure can provide a data processing system and a method for operating the data processing system. The data processing system may include components and resources such as a memory system and a host and dynamically allocate data paths used for transferring data between the components based on usages of the components and the resources.

An implementation of the disclosed disclosure can provide a method and an apparatus for making a memory system, included in a data processing system, transmit map information or metadata to a host or a computing device, or making the host or the computing device to transmit a command along with the map information or the metadata to the memory system, to improve operational performance of the memory system or the data processing system.

An implementation of the disclosed disclosure can provide an apparatus and a method for improving data read performance of a memory system by determining which map information or metadata the memory system transmits to the host or the computing device included in the data processing system before transmitting the map information or the metadata based on a region allocated for a write booster.

According to an embodiment of the disclosure, a memory system can include a memory device including a plurality of memory blocks, each memory block including a memory cell capable of storing a multi-bit data item, wherein the memory device includes a write booster region including at least one memory block among the plurality of memory blocks, the at least one memory block including a memory cell storing a single-bit data item; and a controller configured to assign a memory block, which is included in the write booster region, to a host performance booster (HPB) region when the memory block is closed and transmit, to a host, an indication that the at least one memory block is assigned to the HPB region.

The controller can be further configured to transmit map data to the host in response to a request input from the host, the map data associated with a data item stored in the memory block assigned to the HPB region.

The controller can be configured to include a logical-to-physical (L2P) map data item into the map data, the L2P map data item used for translating a logical address associated with a valid data item stored in the memory block into a physical address.

The controller can be configured to include a logical-to-physical (L2P) map data item into the map data, the L2P map data item used for translating a logical address for a valid data item to be outputted in response to a read request into a physical address, when the read request associated with the map data is input from the host.

The controller can be configured to perform data migration, while there is no data input/output operation corresponding to a request input from the host, the data migration including storing the single-bit data item temporarily stored in a first memory block included in the write booster region to a second memory block, which stores a multi-bit data item per a memory cell, among the memory blocks in the memory device. The first memory block can be the least frequently or recently used memory block in the write booster region.

The controller can be configured to release the first memory block from the write booster region when the data migration for all single-bit valid data items stored in the first memory block is successfully completed.

The controller can be configured to transmit, to the host, an indication that the all single-bit valid data items, which have been migrated through the data migration, are released from the HPB region.

The controller can be further configured to: add a map data item, which is associated with a data item migrated or moved by the data migration, into a response or a notification after completing the data migration; and transmit the response or the notification to the host.

When a read request associated with the map data is inputted from the host, the controller can be configured to search for a data item corresponding to the read request in a memory block of the HPB region earlier than another memory block among the memory blocks.

In another embodiment, a method is for operating a memory system including a memory device, the memory device including memory blocks including a memory cell capable of storing a multi-bit data item. The plurality of memory blocks can include at least one memory block, which is assigned to a write booster region and includes a memory cell storing a single-bit data item. The method can include receiving a write request and a write data item input from a host; programming the write data item in a memory block included in the write booster region; assigning the memory block in the write booster region to a host performance booster (HPB) region when the memory block is closed; and transmitting, to the host, an indication that the memory block is assigned to the HPB region.

The method can further include transmitting map data to the host in a request input from the host. The map data is associated with a data item stored in the memory block assigned to the HPB region.

The method can further include including a logical-to-physical (L2P) map data item in the map data, the L2P map data item used for translating a logical address associated with a valid data item stored in the memory block, into a physical address.

The method can further include including a logical-to-physical (L2P) map data item in the map data, the L2P map data item to be used for translating a logical address associated with a valid data item to be outputted in response to a read request into a physical address, when the memory system receives the read request input from the host.

The method can further include, while there is no data input/output operation corresponding to a request input from the host, performing data migration to store a single-bit data item temporarily stored in a first memory block included in the write booster region to a second memory block, which stores a multi-bit data item per a memory cell, among the memory blocks in the memory device. The first memory block can be the least frequently or recently used memory block in the write booster region.

The method can further include releasing the first memory block from the write booster region when the data migration for all single-bit valid data items stored in the first memory block is successfully completed.

The method can further include adding a map data item, which is associated with a data item migrated or moved by the data migration, into a response or a notification after completing the data migration; and transmitting the response or the notification to the host.

The method can further include transmitting, to the host, an indication that the all single-bit valid data items, which have been migrated through the data migration, are released from the HPB region.

In another embodiment, a controller is coupled via at least one data path to a memory device including memory blocks, each memory block including memory cells, each memory cell capable of storing a multi-bit data item. The controller can include at least one processor, at least one memory, and logic, at least a portion of the logic included in hardware and executed by the at least one processor, the logic to: receive a write request and a write data item input from a host; program the write data item in a write booster region of the memory device, wherein the write booster region includes at least one memory block among the memory blocks, the at least one memory block including a memory cell storing a single-bit data item; assign a memory block included in the write booster region to a host performance booster (HPB) region when the memory block is closed; and transmit, to the host, an indication that the memory block is assigned to the HPB region.

The logic can be configured to transmit map data to the host in response to a request input from the host, the map data associated with a data item stored in the memory block assigned to the HPB region.

The logic can be configured to include a logical-to-physical (L2P) map data item to the map data, the L2P map data item used for translating a logical address for a data item stored in the memory block into a physical address, in response to the request.

When a read request associated with the map data is inputted from the host, the logic can be configured to search for a data item corresponding to the read request in a memory block of the HPB region earlier than another memory block among the memory blocks.

The logic can be configured to perform data migration while there is no data input/output operation corresponding to a request input from the host, the data migration including storing a single-bit data item temporarily stored in a first memory block included in the write booster region to a second memory block, which stores a multi-bit data item per a memory cell, among the memory blocks in the memory device. The first memory block can be the least frequently or recently used memory block in the write booster region.

Embodiments of the disclosed technology will now be described with reference to the accompanying drawings, wherein like numbers reference like elements.

FIG. 1 shows an embodiment of a data processing system which includes a memory system 110 in communication with a host 102.

Referring to FIG. 1, the host 102 may include a processor 104, a host memory 106, and a host controller interface 108. The memory system 110 may include a controller 130 and a memory device 150. The controller 130 and memory device 150 of FIG. 1 may correspond to the controller 130 and memory device 150 of FIGS. 2 to 3.

The processor 104 may have higher performance than that of the memory system 110, and the host memory 106 may be capable of storing a larger amount of data than the memory system 110. The processor 104 and host memory 106 can have an advantage in terms of space and upgrade. For example, the processor 104 and host memory 106 can have less space limitations than processor 134 and memory 144 in the memory system 110. The processor 104 and the host memory 106 can be upgraded to improve performance, which may be distinguishable from the processor 134 and the memory 144 in the memory system 110. In an embodiment, the memory system 110 can utilize the resources of the host 102 in order to increase operation efficiency of the memory system 110.

In an embodiment, as an amount of data which can be stored in the memory system 110 increases, an amount of metadata corresponding to the data stored in memory system 110 also increases. When storage capability used to load the metadata in the memory 144 of the controller 130 is limited or restricted, the increase in an amount of loaded metadata may cause an operational burden on operations of the controller 130.

For example, because of limitation of space or region allocated for metadata in the memory 144 of the controller 130, only part of the metadata may be loaded. If loaded metadata does not include specific metadata for a physical location to which the host 102 is intended to access, the controller 130 may have to store, in the memory device 150, the loaded metadata (some of which has been updated), and the controller 130 may also have to load the specific metadata for the physical location to which the host 102 is intended to access. These operations may have to be performed in order for the controller 130 to perform a read operation or a write operation requested by the host 102. As a result, these effects may cause a degradation of performance of the memory system 110.

In some cases, the storage capability of the host memory 106 in the host 102 may be greater (e.g., by tens or hundreds of times) than that of the memory 144 in the controller 130. The memory system 110 may transfer metadata 166 used by the controller 130 to the host memory 106 in the host 102, so that at least some part of the host memory 106 in the host 102 may be accessed by the memory system 110. The at least some part of the host memory 106 can be used as a cache memory for address translation to read or write data in the memory system 110.

In this case, the host 102 may translate a logical address to a physical address based on the metadata 166 stored in the host memory 106, before transmitting the logical address with a request, command or instruction to the memory system 110. Then, the host 102 can transmit the translated physical address with the request, the command or instruction to the memory system 110.

The memory system 110, which receives the translated physical address with the request, command or instruction may skip an internal process of translating the logical address to the physical address and access the memory device 150 based on the physical address that was transferred. In this case, overheads (e.g., operational burden) caused by the controller 130 to load metadata from the memory device 150 for the address translation can be significantly reduced or vanished, and operational efficiency of the memory system 110 can be enhanced.

Even if the memory system 110 transmits the metadata 166 to the host 102, the memory system 110 can control or manage information related to the metadata 166, such as generation, erase and update of metadata. The controller 130 in the memory system 110 may perform a background operation (e.g., garbage collection and wear leveling) based on an operation state of the memory device 150 and can determine a physical address (e.g., the physical location) in which the memory device 150 for data transferred from the host 102 is stored. Because a physical address of data stored in the memory device 150 can be changed and the host 102 may not recognize the changed physical address, the memory system 110 may be configured to control or manage the information related to metadata 166 which is to be transmitted to the host 102.

While the memory system 110 controls or manages metadata for the address translation, the memory system 110 can determine whether to modify or update the metadata 166 previously transmitted to the host 102. If the memory system 110 determines to modify or update the metadata 166 previously transmitted to the host 102, the memory system 110 can send a signal or a metadata to the host 102 to request the update of the metadata 166 stored in the host 102. The host 102 may update the stored metadata 166 in the host memory 106 in response to a request delivered from the memory system 110. This allows the metadata 166 stored in the host memory 106 to be kept as the latest version, and the operation can proceed without errors even though the host controller interface 108 uses the metadata 166 stored in host memory 106 to translate a logical address to a physical address to be transmitted with the logical address to memory system 110.

Figure 4:
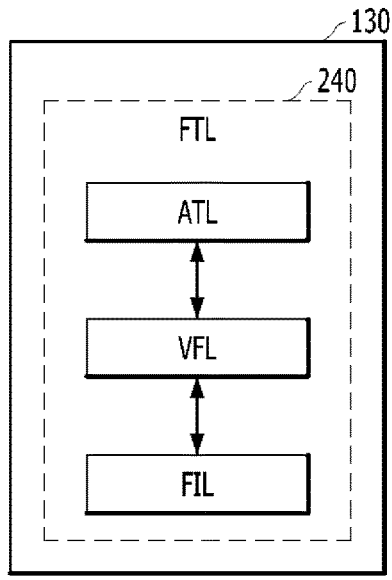
FIG. 4 illustrates an embodiment of a controller.

The metadata 166 stored in the host memory 106 may include mapping information for translating a logical address to a physical address. Referring to FIG. 4, in one embodiment, metadata associating a logical address with a physical address may include two items: first mapping information for translating a logical address to a physical address; and a second mapping information for translating a physical address to a logical address. The metadata 166 stored in the host memory 106 may include the first mapping information. The second mapping information can be primarily used for internal operations of the memory system 110, but might not be used for operations requested by the host 102 to store data in the memory system 110 or to read data corresponding to a particular logical address from the memory system 110. In an embodiment, the second mapping information may be not transmitted by the memory system 110 to the host 102.

The controller 130 in the memory system 110 can control (e.g., create, delete, update, etc.) the first mapping information or the second mapping information, and may store the first mapping information or the second mapping information in the memory device 150. Because the host memory 106 is a volatile memory, the metadata 166 stored in the host memory 106 may disappear when an event such as interruption of power supply to the host 102 and the memory system 110 occurs. Accordingly, the controller 130 may keep the latest state of the metadata 166 stored in the host memory 106 of the host 102, and may also store the first mapping information or second mapping information in the memory device 150. The first mapping information or the second mapping information stored in the memory device 150 can be, for example, the most recent one.

Referring to FIG. 1, the memory device 150 may include a Host Performance Booster (HPB) region 162 and a write booster region 164. The HPB region 162 and the write booster region 164 may refer to a logical storage space in which at least one memory block of memory blocks in the memory device 150 are functionally allocated or assigned. The HPB region 162 can include a storage space in which data items corresponding to mapping information transmitted from the memory system 110 to the host 102 are stored. The write booster region 164 can include a storage space established to improve write performance of the memory system 110.

In order to increase the speed of operation requested by the host 102 to program a data item (e.g., a write data item to be stored in memory system 110), the memory system 110 can establish and use the write booster region 164 in response to a request of the host 102. For example, input write data may first be stored in the write booster region 164.

The memory device 150 includes a plurality of memory blocks, with each memory block including a plurality of memory cells. Each memory cell is capable of storing a multi-bit data item in order to store more data per unit area or unit volume. When the memory system 110 programs a multi-bit data item in a memory block, a write operation (or a program operation) can take a longer operation time than a program operation for storing a single-bit data item in the memory block.

To improve the speed of the write operation, the memory system 110 may store a single-bit data item in a memory block including a memory cell capable of storing a multi-bit data item in memory device 150, in order to reduce the time for completing the write operation. The memory system 110 may establish the write booster region 164 to temporarily store a single-bit data item in a memory cell of a memory block, even though the memory cell can store a multi-bit data item.

The write booster region 164 may include at least one memory block. An operation for assigning a specific memory block to the write booster region 164 or releasing a specific memory block from the write booster region 164 can be different according to an internal operation of the memory system 110 or a related policy or an operation state (e.g., P/E cycles) of the corresponding memory block. According to an embodiment, the number of memory blocks in the write booster region 164 may be adjusted according to an amount of data stored in the memory device 150 or a program pattern requested by the host 102.

Further, at least one memory block in the memory system 150 may be assigned to the HPB region 162. When the mapping information is transmitted to the host 102, the speed of a read operation (of reading a data item corresponding to the mapping information) can be improved because the memory system 110 might not perform address translation from a logical address to a physical address for the read operation. Accordingly, it may be desirable for the memory system 110 to transmit mapping information or map data items regarding data items frequently used (e.g., frequently requested to be read) by the host 102.

In an embodiment, when data items have been programmed in all pages in the memory block in the write booster region 164 (e.g., when the memory block become in a closed state), the corresponding memory block can be assigned to the HPB region 162, so that map data items regarding data items stored in the corresponding memory block can be transferred to the host 102. Data items frequently used by the host 102 are likely to include data items recently stored in the memory system 110. Accordingly, when the memory system 110 stores data items in a memory block in the write booster region 164 and the corresponding memory block becomes closed, the memory block may be set as the HPB region 162. The controller 130 may transmit mapping information regarding data items in the corresponding memory block, set as the HPB region 162, to the host 102.

Figure 9:
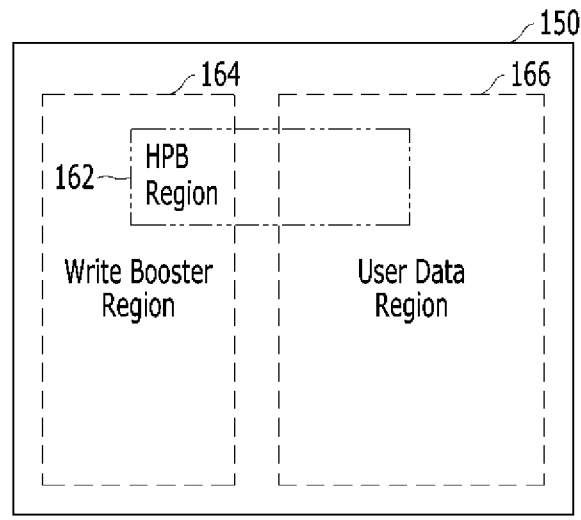
FIG. 9 illustrates an embodiment of a memory device.

According to an embodiment, when the memory system 110 enters an idle state, the controller 130 can move or transfer data items stored in the write booster region 164 to another area in the memory device 150 (e.g., a user data region 166 or the like in FIG. 9). When moving data from the write booster region 164 to the user data region 166, the controller 130 may start data migration from a memory block in which data was programmed in the oldest among the memory blocks in the write booster region 164. According to an embodiment, the controller 130 can perform the data migration from the least frequently or recently used memory block in the write booster region 164.

In addition, when the number of free blocks in the write booster region 164 is insufficient, the controller 130 may perform garbage collection on the write booster area 164 for the data migration and then move valid data items only to the user data region 166. When garbage collection is performed, the controller 130 can first select a memory block having the least valid data items (e.g., latest data items) among memory blocks in the write booster region 164. According to an embodiment, after data migration is performed on a memory block set as the HPB region 162, the corresponding memory block may be released from the HPB region 162.

Hereinafter, descriptions will be made focusing on contents that can be technically classified in the controller 130 and the memory device 150 shown in FIG. 1 and the controller 130 and the memory device 150 described in FIGS. 2 to 4. For example, a flash translation layer (FTL) 240 in the controller 130 will be described with reference to FIGS. 3 to 4. In an embodiment, the roles and functions of the flash conversion layer (FTL) in the controller 130 may be different for an operation purpose or a performance of the memory system 110.

Figure 2:
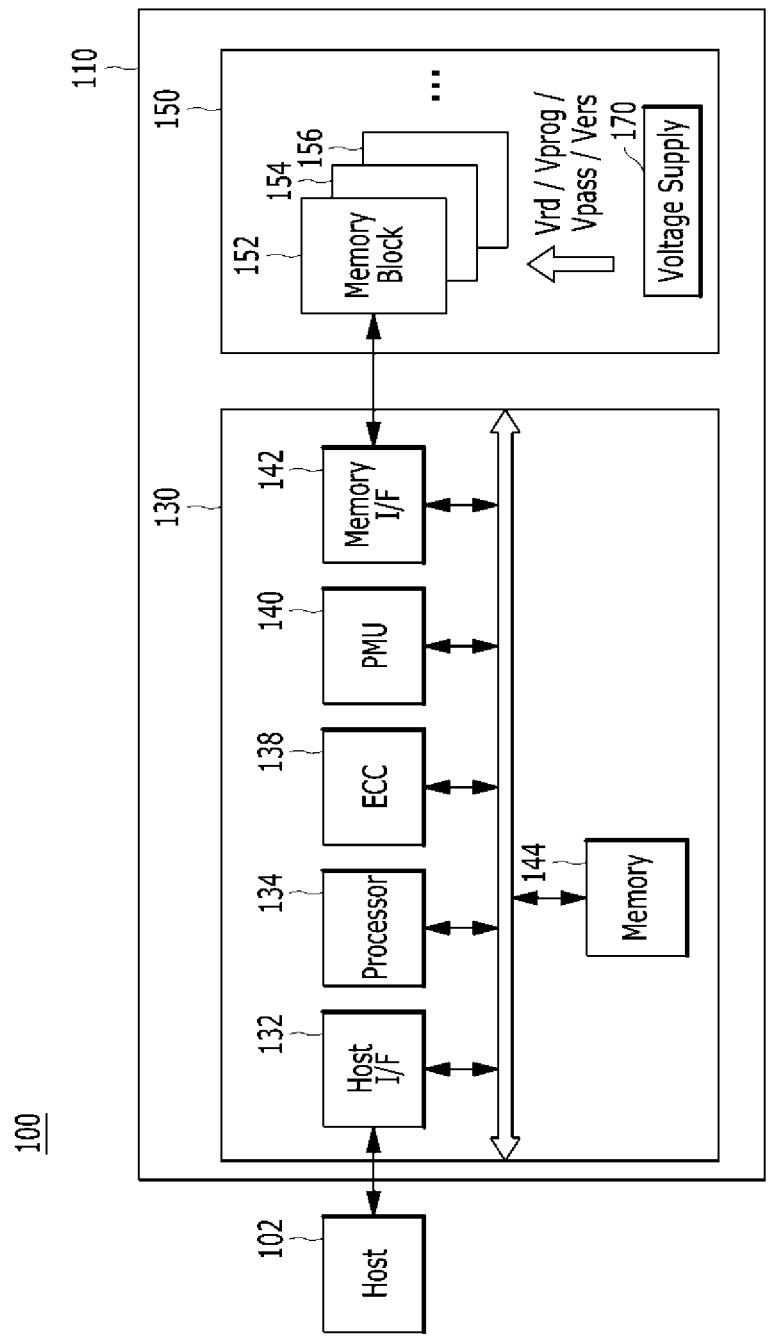
FIG. 2 illustrates an embodiment of a data processing system.
Figure 3:
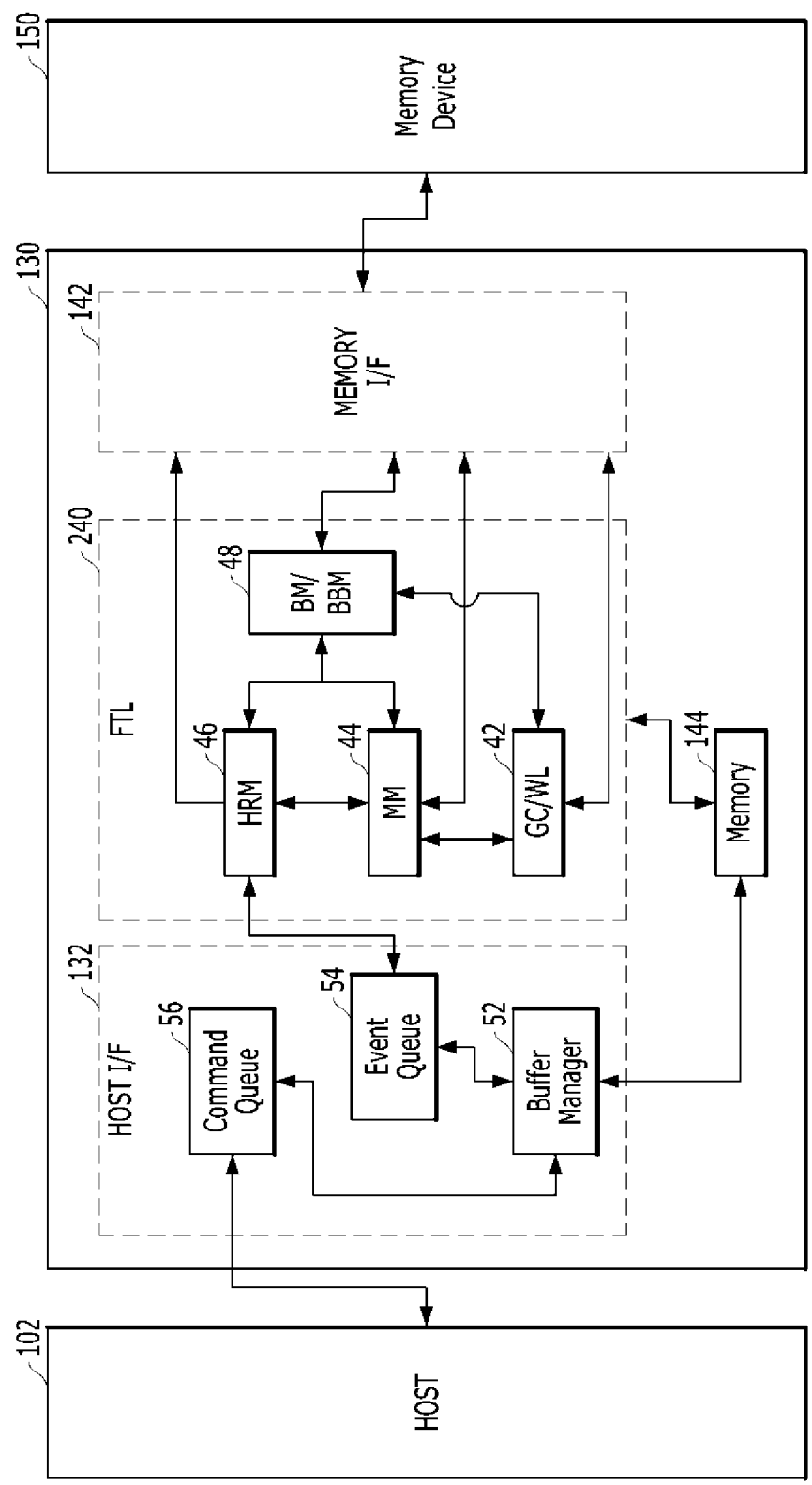
FIG. 3 illustrates an embodiment of a memory system.

FIGS. 2 and 3 illustrate some operations that may be performed by the memory system 110 according to one or more embodiments.

Referring to FIG. 2, the data processing system 100 may include a host 102 engaged or coupled with a memory system, such as memory system 110. For example, the host 102 and the memory system 110 can be coupled to each other via a data bus, a host cable and the like to perform data communication.

The memory system 110 may include a memory device 150 and a controller 130. The memory device 150 and the controller 130 may be components or elements physically separated from each other. The memory device 150 and the controller 130 may be connected via at least one data path, which for example, may include a channel and/or a way.

According to an embodiment, the memory device 150 and the controller 130 may be components or elements that are functionally divided. Further, according to an embodiment, the memory device 150 and the controller 130 may be implemented with a single chip or a plurality of chips. The controller 130 may perform a data input/output operation in response to a request input from the external device. For example, when the controller 130 performs a read operation in response to a read request input from an external device, data stored in a plurality of non-volatile memory cells in memory device 150 is transferred to the controller 130.

As shown in FIG. 2, the memory device 150 may include a plurality of memory blocks 152, 154, 156. 156 may be understood as a group of non-volatile memory cells in which data is removed together by a single erase operation. The memory block 152, 154, 156 may include a page, which may correspond to a group of non-volatile memory cells that store data together during a single program operation or output data together during a single read operation. For example, one memory block may include a plurality of pages.

The memory device 150 may include, for example, a plurality of memory planes or a plurality of memory dies. According to an embodiment, the memory plane may be considered a logical or a physical partition including at least one memory block, a driving circuit capable of controlling an array including a plurality of non-volatile memory cells, and a buffer that can temporarily store data input to or output from non-volatile memory cells.

According to an embodiment, a memory die may include at least one memory plane. In one embodiment, a memory die may be understood as a set of components implemented on a physically distinguishable substrate. Each memory die may be connected to the controller 130 through a data path and, for example, may include an interface to exchange an item of data and signals with the controller 130.

According to an embodiment, the memory device 150 may include at least one memory block 152, 154, 156, at least one memory. The internal configuration of the memory device 150 shown in FIG. 2 may be different according to performance of memory system 110. have a different internal configuration from the one shown in FIG. 2 in another embodiment.

Referring to FIG. 2, the memory device 150 may include a voltage supply circuit capable of supplying one or more voltages to the memory block 152, 154, 156. a read voltage Vrd, a program voltage Vprog, a pass voltage Vpass, and/or an erase voltage Vers to a non-volatile memory cell in a memory block. For example, during a read operation (to read data stored in the non-volatile memory cell in one of the memory blocks 152, 154, 156), the voltage supply circuit may supply the read voltage Vrd to a selected non-volatile memory cell.

During a program operation for storing data in a non-volatile memory cell in one of the memory blocks 152, 154, 156, the voltage supply circuit may supply the program voltage Vprog to a selected non-volatile memory cell.

During a read operation or a program operation performed on the selected nonvolatile memory cell, the voltage supply circuit may supply a pass voltage Vpass to a non-selected nonvolatile memory cell. During the erasing operation for erasing data stored in the non-volatile memory cell of one of the memory blocks 152, 154, 156, the voltage supply circuit may supply the erase voltage Vers to the memory block.

The memory device 150 may store information regarding various voltages supplied to the memory block 152, 154, 156 based on which operation is performed. For example, when a non-volatile memory cell in one of the memory blocks 152, 154, 156 can store multi-bit data, plural levels of the read voltage Vrd for recognizing or reading the multi-bit data item may be used. The memory device 150 may include a table including information corresponding to plural levels of the read voltage Vrd that correspond to the multi-bit data item. For example, the table can include bias values stored in a register, where each bias value corresponds to a specific level of the read voltage Vrd. The number of bias values for the read voltage Vrd used for a read operation may be limited to a preset range. Also, the bias values can be quantized.

The host 102 may include or correspond to a portable electronic device (e.g., a mobile phone, an MP3 player, a laptop computer, etc.) or a non-portable electronic device (e.g., a desktop computer, a game player, a television, a projector, etc.).

The host 102 may also include at least one operating system (OS), which can control functions and operations performed in the host 102. The OS can provide interoperability between the host 102 engaged operatively with the memory system 110 and the user who intends to store data in the memory system 110. The OS may support functions and operations corresponding to user requests.

By way of example but not limitation, the OS can be classified as a general operating system and a mobile operating system according to mobility of the host 102. The general operating system may be split into a personal operating system and an enterprise operating system according to system requirements or a user environment. Compared with the personal operating system, the enterprise operating systems can be specialized for securing and supporting high performance computing.

The mobile operating system may be subject to support services or functions for mobility (e.g., a power saving function). The host 102 may include a plurality of operating systems. The host 102 may execute multiple operating systems, interlocked with the memory system 110, corresponding to a user request. The host 102 may transmit a plurality of commands corresponding to user requests to the memory system 110, thereby performing operations corresponding to commands in the memory system 110.

The controller 130 in the memory system 110 may control the memory device 150 in response to a request or a command input from the host 102. For example, the controller 130 may perform a read operation to provide an item of data read from the memory device 150 for the host 102 and may perform a write operation (or a program operation) to store an item of data input from the host 102 in the memory device 150. In order to perform data input/output (I/O) operations, the controller 130 may control and manage internal operations for data read, data program, data erase, or the like.

According to an embodiment, the controller 130 can include a host interface 132, a processor 134, error correction circuitry 138, a power management unit (PMU) 140, a memory interface 142, and a memory 144. Components in the controller 130 may vary from those illustrated in FIG. 2 in terms of structure, function, operation performance, and/or other aspects among embodiments. For example, the memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components in the controller 130 may be added or omitted based on implementation of the memory system 110.

The host 102 and the memory system 110 may include a controller or an interface for transmitting and receiving signals, an item of data, and the like in accordance with one or more predetermined protocols. For example, the host interface 132 in the memory system 110 may include an apparatus capable of transmitting signals, an item of data, and the like to the host 102 or receiving signals, an item of data, and the like from host 102.

The host interface 132 may receive signals, commands (or requests), and/or an item of data from the host 102. For example, the host 102 and the memory system 110 may use a predetermined protocol to transmit and receive an item of data between each other. Examples of protocols or interfaces supported by the host 102 and the memory system 110 for sending and receiving an item of data include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), and the like. According to an embodiment, the host interface 132 is a type of layer for exchanging an item of data with the host 102 and is implemented with, or driven by, firmware called a host interface layer (HIL).

The Integrated Drive Electronics (IDE) or Advanced Technology Attachment (ATA) may be used as one of the interfaces for transmitting and receiving an item of data and, for example, may use a cable including 40 wires connected in parallel to support data transmission and reception between the host 102 and the memory system 110. When a plurality of memory systems 110 are connected to a single host 102, the memory systems 110 may be divided into a master and one or more slaves using a position or a dip switch to which the memory systems 110 are connected. The memory system 110 set as the master may be used as the main memory device. The IDE (ATA) may include, for example, Fast-ATA, ATAPI, and Enhanced IDE (EIDE).

Serial Advanced Technology Attachment (SATA) is a type of serial data communication interface compatible with various ATA standards of parallel data communication interfaces used by Integrated Drive Electronics (IDE) devices. The 40 wires in the IDE interface can be reduced to six wires in the SATA interface. For example, 40 parallel signals for the IDE can be converted into 6 serial signals for SATA to be transmitted between each other. The SATA has been widely used because of its faster data transmission and reception rate, and its less resource consumption in the host 102 used for data transmission and reception.

SATA may support connection with up to 30 external devices to a single transceiver in the host 102. In addition, SATA can support hot plugging that allows an external device to be attached or detached from the host 102, even while data communication between the host 102 and another device is being executed. Thus, the memory system 110 can be connected or disconnected as an additional device, like a device supported by a Universal Serial Bus (USB) even when the host 102 is powered on. For example, in the host 102 having an eSATA port, the memory system 110 may be freely detached like an external hard disk.

Small Computer System Interface (SCSI) is a type of serial data communication interface used for a connection between a computer, a server, and/or other peripheral devices. The SCSI can provide high transmission speeds compared with other interfaces such as IDE and SATA. In SCSI, the host 102 and at least one peripheral device (e.g., memory system 110) are connected in series, but data transmission and reception between the host 102 and each peripheral device may be performed through a parallel data communication. In SCSI, it is easy to connect to, or disconnect from, the host 102 a device such as the memory system 110. SCSI can support connections of 15 other devices to a single transceiver in host 102.

Serial Attached SCSI (SAS) can be understood as a serial data communication version of the SCSI. In SAS, not only the host 102 and a plurality of peripheral devices are connected in series, but also data transmission and reception between the host 102 and each peripheral device may be performed in a serial data communication scheme. SAS can support a connection between the host 102 and the peripheral device through a serial cable instead of a parallel cable to easily manage equipment using SAS and enhance or improve operational reliability and communication performance. SAS may support connections of eight external devices to a single transceiver included in the host 102.

The Non-volatile memory express (NVMe) can be understood as a scalable host controller interface that was designed to address the needs of enterprise and client applications that utilize PCI Express-based solid-state storage, to increase performance and design flexibility of the host 102, servers, computing devices, and the like equipped with the non-volatile memory system 110. PCIe can use a slot or a specific cable for connecting the host 102 (e.g., a computing device) and the memory system 110 (e.g., a peripheral device). For example, PCIe can use a plurality of pins (for example, 18 pins, 32 pins, 49 pins, 82 pins, etc.) and at least one wire (e.g. x1, x4, x8, x16, etc.) to achieve high speed data communication over several hundred MB per second (e.g. 250 MB/s, 500 MB/s, 984.6250 MB/s, 1969 MB/s, and etc.). According to an embodiment, the PCIe scheme may achieve bandwidths of tens to hundreds of Giga bits per second. A system using the NVMe can make the most of an operation speed of the non-volatile memory system 110, such as an SSD, which operates at a higher speed than a hard disk.

According to an embodiment, the host 102 and the memory system 110 may be connected through a universal serial bus (USB). The Universal Serial Bus (USB) is a type of scalable, hot-pluggable plug-and-play serial interface that can provide cost-effective standard connectivity between the host 102 and a peripheral device, such as a keyboard, a mouse, a joystick, a printer, a scanner, a storage device, a modem, a video camera, and the like. A plurality of peripheral devices such as the memory system 110 may be coupled to a single transceiver included in the host 102.

Referring to FIG. 2, the error correction circuitry 138 can correct error bits of the data to be processed in (e.g., output from) the memory device 150, which may include an error correction code (ECC) encoder and an ECC decoder. The ECC encoder can perform error correction encoding of data to be programmed in the memory device 150 to generate encoded data into which a parity bit is added and store the encoded data in memory device 150. The ECC decoder can detect and correct errors contained in data read from the memory device 150 when the controller 130 reads the data stored in the memory device 150. For example, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use a parity bit generated during the ECC encoding process for correcting the error bit of the read data. When the number of the error bits is greater than or equal to a threshold number of correctable error bits, the error correction circuitry 138 might not correct error bits but instead may output an error correction fail signal indicating failure in correcting the error bits.

According to an embodiment, the error correction circuitry 138 may perform an error correction operation based on a coded modulation. Examples include a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include all circuits, modules, systems, and/or devices for performing the error correction operation based on at least one of the above described codes.

For example, the ECC decoder may perform hard decision decoding or soft decision decoding to data transmitted from the memory device 150. Hard decision decoding may include an operation of correcting an error by reading digital data of '0' or '1' from a non-volatile memory cell in the memory device 150. Because hard decision decoding handles a binary logic signal, the circuit/algorithm design or configuration may be simpler and processing speed may be faster than soft decision decoding.

Soft decision decoding may quantize a threshold voltage of a non-volatile memory cell in the memory device 150 by two or more quantized values (e.g., multiple bit data, approximate values, an analog value, and the like) in order to correct an error based on the two or more quantized values. The controller 130 can receive two or more alphabets or quantized values from a plurality of non-volatile memory cells in the memory device 150, and then can perform decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. The low-density parity-check (LDPC) code uses an algorithm that can read values of data from the memory device 150 in several bits according to reliability, not simply data of 1 or 0 like hard decision decoding, and iteratively repeats it through a message exchange in order to improve reliability of the values. Then, the values are finally determined as data of 1 or 0. For example, a decoding algorithm using LDPC codes can be understood as probabilistic decoding.

Hard decision decoding is one in which the value output from a non-volatile memory cell is coded as 0 or 1. Compared to hard decision decoding, soft decision decoding can determine the value stored in the non-volatile memory cell based on the stochastic information. Regarding bit-flipping (which may be considered an error that can occur in the memory device 150), soft decision decoding may provide improved probability of correcting error and recovering data, as well as provide reliability and stability of corrected data. The LDPC-GM code may have a scheme in which internal LDGM codes can be concatenated in series with high-speed LDPC codes.

According to an embodiment, the ECC decoder may use, for example, low-density parity-check convolutional codes (LDPC-CCs) code for soft decision decoding. The LDPC-CCs code may have a scheme using a linear time encoding and a pipeline decoding based on a variable block length and a shift register.

According to an embodiment, the ECC decoder may use, for example, a Log Likelihood Ratio Turbo Code (LLR-TC) for soft decision decoding. The Log Likelihood Ratio (LLR) may be calculated as a non-linear function for a distance between a sampled value and an ideal value. In addition, Turbo Code (TC) may include a simple code (for example, a Hamming code) in two or three dimensions and repeat decoding in a row direction and a column direction to improve reliability of values.

The power management unit (PMU) 140 may control electrical power provided in the controller 130. The PMU 140 may monitor the electrical power supplied to the memory system 110 (e.g., a voltage supplied to the controller 130) and may provide the electrical power to components in the controller 130. The PMU 140 can not only detect power-on or power-off, but also can generate a trigger signal to enable the memory system 110 to back up a current state urgently when the electrical power supplied to the memory system 110 is unstable. According to an embodiment, the PMU 140 may include a device or a component capable of accumulating electrical power that may be used, for example, in an emergency.

The memory interface 142 may serve as an interface for handling commands and data transferred between the controller 130 and the memory device 150, in order to allow the controller 130 to control the memory device 150 in response to a command or a request input from the host 102. The memory interface 142 may generate a control signal for the memory device 150 and may process data input to, or output from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a type of working memory in the memory system 110 or controller 130, while storing temporary or transactional data which occurred or was delivered for operations in the memory system 110 and the controller 130. For example, the memory 144 may temporarily store read data output from the memory device 150 in response to a request from the host 102, before the read data is output to the host 102. In addition, the controller 130 may temporarily store write data input from the host 102 in the memory 144, before programming the write data in the memory device 150. When the controller 130 controls operations such as data read, data write, data program, data erase, etc., of the memory device 150, an item of data transmitted or generated between the controller 130 and the memory device 150 of the memory system 110 may be stored in memory 144.

In addition to the read data or write data, the memory 144 may store information (e.g., map data, read requests, program requests, etc.) used for inputting or outputting data between the host 102 and the memory device 150. According to an embodiment, the memory 144 may include a command queue, a program memory, a data memory, a write buffer/cache, a read buffer/cache, a data buffer/cache, a map buffer/cache, and/or the like. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 within the controller 130, the embodiments are not limited thereto. The memory 144 may be located within or external and coupled to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. According to an embodiment, the processor 134 may execute firmware or other instructions to control the program operation or the read operation in the memory system 110. Herein, the firmware may be referred to as a flash translation layer (FTL). An example of the FTL is described with reference to FIG. 3. According to an embodiment, the processor 134 may be implemented with a microprocessor or a central processing unit (CPU).

According to an embodiment, the memory system 110 may be implemented with at least one multi-core processor. The multi-core processor is a type of circuit or chip including two or more integrated cores considered to be distinct processing regions. For example, when a plurality of cores in the multi-core processor drive or execute a plurality of flash translation layers (FTLs) independently, data input/output speed (or performance) of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may be independent of a command or a request input from an external device such as the host 102. In one case, an operation performed by the controller 130 in response to the request or the command input from the host 102 may be considered a foreground operation. An operation performed by the controller 130 independently (e.g., regardless the request or the command input from the host 102) may be considered a background operation. The controller 130 can perform foreground or background operations for read, write or program, erase and the like, regarding an item of data in the memory device 150. In addition, a parameter set operation corresponding to a set parameter command or a set feature command as a set command transmitted from the host 102 may be considered a foreground operation. As a background operation without a command transmitted from the host 102, the controller 130 can perform garbage collection (GC), wear leveling (WL), bad block management for identifying and processing bad blocks, or the like. The background operations may be performed in relation to a plurality of memory blocks 152, 154, 156 in the memory device 150.

According to an embodiment, substantially similar operations may be performed as both the foreground operation and the background operation. For example, when the memory system 110 performs garbage collection in response to a request or a command input from the host 102 (e.g., Manual GC), garbage collection can be considered a foreground operation. When the memory system 110 performs garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform parallel processing regarding plural requests or commands input from the host 102 in order to improve performance of the memory system 110. For example, the transmitted requests or commands may be divided and processed in parallel within at least some of a plurality of planes, a plurality of dies or a plurality of chips in the memory device 150. The memory interface 142 may be connected to a plurality of planes, dies or chips in the memory device 150 through at least one channel and at least one way.

When the controller 130 distributes and stores data in the plurality of dies through each channel or each way in response to requests or a commands associated with a plurality of pages including non-volatile memory cells, plural operations corresponding to the requests or the commands can be performed individually or in parallel. Such a processing method or scheme can be considered as an interleaving method. Because data input/output speed of the memory system 110 operating with the interleaving method may be faster than that without the interleaving method, data I/O performance of the memory system 110 can be improved.

By way of example but not limitation, the controller 130 can recognize statuses regarding a plurality of channels (or ways) associated with a plurality of memory dies in the memory device 150. The controller 130 may determine the status of each channel or each way as one of, for example, a busy status, a ready status, an active status, an idle status, a normal status, and/or an abnormal status. The determination of which channel or way an instruction (and/or a data) is delivered through by the controller can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a set format or structure. For instance, the descriptors may include device descriptors, configuration descriptors, unit descriptors, and the like. The controller 130 can refer to, or use, the descriptors to determine which channel(s) or way(s) an instruction or a data is exchanged via.

Referring to FIG. 2, the memory device 150 in the memory system 110 may include memory blocks 152, 154, 156. Each of the memory blocks 152, 154, 156 includes a plurality of non-volatile memory cells. According to an embodiment, the memory block 152, 154, 156 can be a group of non-volatile memory cells erased together. The memory block 152, 154, 156 may include a plurality of pages, one or more of which may correspond to a group of non-volatile memory cells which are read or programmed together. In one embodiment, each memory block 152, 154, 156 may have a three-dimensional stack structure for high integration. Further, the memory device 150 may include a plurality of dies, each die including a plurality of planes, each plane including the memory blocks 152, 154, 156. Configuration of the memory device 150 can be different for performance of the memory system 110.

As shown in FIG. 2, the memory blocks 152, 154, 156 are in the memory device 150. The memory blocks 152, 154, 156 can be any of single-level cell (SLC) memory blocks, multi-level cell (MLC) Cell) memory blocks, or the like, according to the number of bits that can be stored or represented in one memory cell. An SLC memory block includes a plurality of pages implemented by memory cells, each storing one bit of data. An SLC memory block can have high data I/O operation performance and high durability. The MLC memory block includes a plurality of pages implemented by memory cells, each storing multi-bit data item (e.g., two bits or more). The MLC memory block can have larger storage capacity for the same space compared to the SLC memory block. The MLC memory block can be highly integrated in view of storage capacity.

In an embodiment, the memory device 150 may be implemented with MLC memory blocks such as a double level cell (DLC) memory block, a triple-level cell (TLC) memory block, a quadruple-level cell (QLC) memory block and a combination thereof. A double-level cell (DLC) memory block may include a plurality of pages implemented by memory cells, each capable of storing 2-bit data. A triple-level cell (TLC) memory block can include a plurality of pages implemented by memory cells, each capable of storing 3-bit data. A quadruple-level cell (QLC) memory block can include a plurality of pages implemented by memory cells, each capable of storing 4-bit data. In one embodiment, the memory device 150 can be implemented with a block including a plurality of pages implemented by memory cells, each capable of storing five or more bits of data.

According to an embodiment, the controller 130 may use a multi-level cell (MLC) memory block in the memory device 150 as an SLC memory block that stores one-bit data in one memory cell. A data input/output speed of the multi-level cell (MLC) memory block can be slower than that of the SLC memory block. For example, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block (e.g., a memory block in the write booster region 164 shown in FIG. 1). For example, the controller 130 can use the MLC memory block as a buffer to temporarily store an item of data, because the buffer may use a high data input/output speed for improving performance of the memory system 110.

Further, according to an embodiment, the controller 130 may program data in a multi-level cell (MLC) a plurality of times without performing an erase operation on a specific MLC memory block in the memory device 150. Non-volatile memory cells have a feature that does not support data overwrite. However, the controller 130 may use a feature in which a multi-level cell (MLC) may store multi-bit data, in order to program plural 1-bit data in the MLC a plurality of times. For a MLC overwrite operation, the controller 130 may store the number of program times as separate operation information when 1-bit data is programmed in a non-volatile memory cell. In an embodiment, an operation for uniformly levelling threshold voltages of non-volatile memory cells can be carried out before other data is overwritten in the same non-volatile memory cells.

In an embodiment, the memory device 150 is embodied as a non-volatile memory such as a flash memory, for example, as a NAND flash memory, a NOR flash memory, and the like. In an embodiment, the memory device 150 may be implemented by at least one of a phase change random access memory (PCRAM), a ferroelectrics random access memory (FRAM), a spin transfer torque random access memory (SU-RAM), and a spin transfer torque magnetic random access memory (STT-MRAM), or the like.

Referring to FIG. 3, a controller 130 in a memory system may operate with the host 102 and memory device 150. As illustrated, the controller 130 includes a host interface 132, a flash translation layer (FTL) 240, as well as the memory interface 142, and the memory 144 previously identified in connection with FIG. 2.

According to an embodiment, the error correction circuitry 138 illustrated in FIG. 2 may be included in the flash translation layer (FTL) 240. In one embodiment, the error correction circuitry 138 may be implemented as a separate module, a circuit, firmware, or the like, which is included in, or associated with, the controller 130.

The host interface 132 may be capable of handling commands, data, and the like transmitted from the host 102. By way of example but not limitation, the host interface 132 may include a command queue 56, a buffer manager 52, and an event queue 54. The command queue 56 may sequentially store commands, data, and the like, received from the host 102 and output them to the buffer manager 52, for example, in an order in which they are stored. The buffer manager 52 may classify, manage, or adjust the commands, the data and the like received from the command queue 56. The event queue 54 may sequentially transmit events for processing the commands, the data, and the like received from the buffer manager 52.

A plurality of commands or data of the same characteristic (e.g., read or write commands) may be transmitted from the host 102, or plurality of commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what type of internal operation the controller 130 will perform according to the characteristics of commands, data, and the like, which have been entered from the host 102. The host interface 132 can determine a processing order and a priority of commands, data and the like, based at least on their characteristics.

According to characteristics of commands, data, and the like transmitted from the host 102, the buffer manager 52 in the host interface 132 is configured to determine whether the buffer manager should store commands, data, and the like, in the memory 144, or whether the buffer manager should deliver the commands, the data, and the like into the flash translation layer (FTL) 240. The event queue 54 receives events, entered from the buffer manager 52 which are to be internally executed and processed by the memory system 110 or the controller 130 in response to the commands, the data, and the like, transmitted from the host 102, in order to deliver the events to the flash translation layer (FTL) 240 in the order received.

In accordance with an embodiment, the flash translation layer (FTL) 240 illustrated in FIG. 3 may implement a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42, and a block manager 48. The host request manager (HRM) 46 can manage the events entered from the event queue 54. The map manager (MM) 44 can handle or control a map data. The state manager 42 can perform garbage collection (GC) or wear leveling (WL). The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map manager (MM) 44, to determine a physical address corresponding to the logical address which is entered with the events. The host request manager (HRM) 46 can send a read request with the physical address to the memory interface 142, to process the read request (handle the events). In an embodiment, the host request manager (HRM) 46 can send a program request (write request) to the block manager 48 to program data to a specific empty page (no data) in the memory device 150, and then can transmit a map update request corresponding to the program request to the map manager (MM) 44, in order to update an item relevant to the programmed data in information of mapping the logical-physical addresses to each other.

The block manager 48 can convert a program request delivered from the host request manager (HRM) 46, the map manager (MM) 44, and/or the state manager 42, into a flash program request used for the memory device 150 in order to manage flash blocks in the memory device 150. To maximize or enhance program or write performance of the memory system 110 (e.g., see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In an embodiment, the block manager 48 can be configured to manage blocks in the memory device 150 according to the number of valid pages, select and erase blocks having no valid pages when a free block is needed, and select a block including the least number of valid pages when it is determined that garbage collection is to be performed. The state manager 42 can perform garbage collection to move the valid data to an empty block and erase the blocks containing the moved valid data so that the memory device 150 may have enough free blocks (empty blocks with no data). When the block manager 48 provides information regarding a block to be erased to the state manager 42, the state manager 42 may check all flash pages of the block to be erased to determine whether each page is valid.

For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process various requests, for example, queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the state manager 42 requests the map update in a state in which copying of valid page(s) is not completed normally, the map manager 44 might not perform the mapping table update. This is because the map request is issued with old physical information when the state manger 42 requests a map update and a valid page copy is completed later. The map manager 44 may perform a map update operation to ensure accuracy when, or only if, the latest map table still points to the old physical address.

FIG. 4 illustrates an embodiment of the controller 130 of FIG. 1

Referring to FIG. 4, the controller 130 may include a flash translation layer (FTL) 240 in the controller 130 can be divided into three layers: an address translation layer ATL; a virtual flash layer VFL; and a flash Interface Layer FIL.

For example, the address translation layer ATL may convert a logical address LA transmitted from a file system to a logical page address. The address translation layer ATL can perform an address translation process regarding a logical address space. For example, the address translation layer ATL can perform an address translation process based on mapping information to which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, to a virtual page address VPA. The virtual page address VPA may correspond to a physical address of a virtual memory device. For example, the virtual page address VPA may correspond to the memory block 60 in the memory device 150. If there is a bad block among the memory blocks 60 in the memory device 150, the bad block may be excluded by the virtual flash layer VFL.

In addition, the virtual flash layer VFL can include a recovery algorithm for scanning a scan area to restore the logical-to-virtual address mapping information (L2V mapping) stored in the memory device 150 and mapping information in the data region for storing user data. The recovery algorithm can be capable of recovering the logical-to-virtual address mapping information (L2V mapping). The virtual flash layer VFL may perform an address conversion process regarding the virtual address space, based on the logical-to-virtual address mapping information (L2V mapping) restored through such the recovery algorithm.

The flash interface layer FIL can convert a virtual page address of the virtual flash layer VFL to a physical page address of the memory device 150. The flash interface layer FIL performs a low-level operation for interfacing with the memory device 150. For example, the flash interface layer FIL can include a low-level driver for controlling hardware of the memory device 150, an error correction code (ECC) for checking and correcting an error in data transmitted from the memory device 150, and a module for performing operations such as Bad Block Management (BBM).

Figure 5:
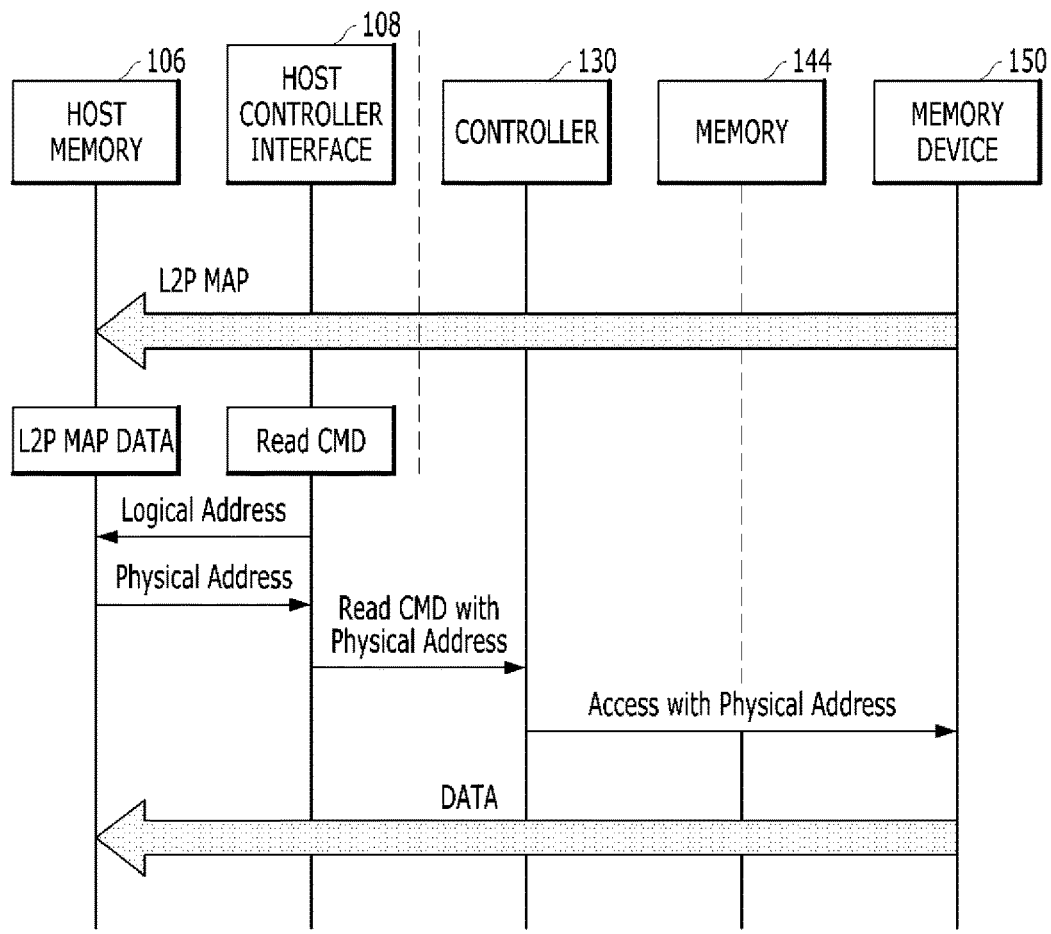
FIG. 5 illustrates an embodiment of a read operation.

FIG. 5 illustrates an embodiment of a read operation performed in a host and a memory system in a data processing system as described herein. Referring to FIGS. 1 and 5, an operation requested by the host 102 to read data stored in the memory system 110 is described when the metadata 166 is stored in the host memory 106 of the host 102.

Power is supplied to the host 102 and the memory system 110, and then the host 102 and the memory system 110 can be engaged with each other. When the host 102 and the memory system 110 cooperate, metadata (L2P MAP) stored in the memory device 150 can be transferred to the host memory 106.

When a read command (Read CMD) is issued by the processor 104 in the host 102, the read command is transmitted to the host controller interface 108. After receiving the read command, the host controller interface 108 searches for a physical address corresponding to a logical address corresponding to the read command in the metadata (L2P MAP) stored in the host memory 106. Based on the metadata (L2P MAP) stored in the host memory 106, the host controller interface 108 can recognize the physical address corresponding to the logical address. The host controller interface 108 carries out an address translation for the logical address associated with the read command.

The host controller interface 108 transfers the read command (Read CMD) with the logical address as well as the physical address to the controller 130 of the memory system 110. The controller 130 can access the memory device 150 based on the physical address transferred with the read command. Data stored at a location corresponding to the physical address in the memory device 150 can be transferred to the host memory 106 in response to the read command (Read CMD).

In some cases, an operation of reading data stored in the memory device 150 including a nonvolatile memory may take more time than an operation of reading data stored in the host memory 106, which is a volatile memory. In the above-described read operation performed in response to the read command (Read CMD), since the controller 130 receives the physical address with the read command (Read CMD), the controller 130 can skip or omit an address translation to search for a physical address corresponding to the logical address provided from the host 102. For example, the controller 130 may not have to load metadata from the memory device 150 or may replace the metadata stored in the memory 144 when the controller 130 cannot find metadata for the address translation in the memory 144. This allows the memory system 110 to perform a read operation requested by the host 102 more quickly.

Figure 6:
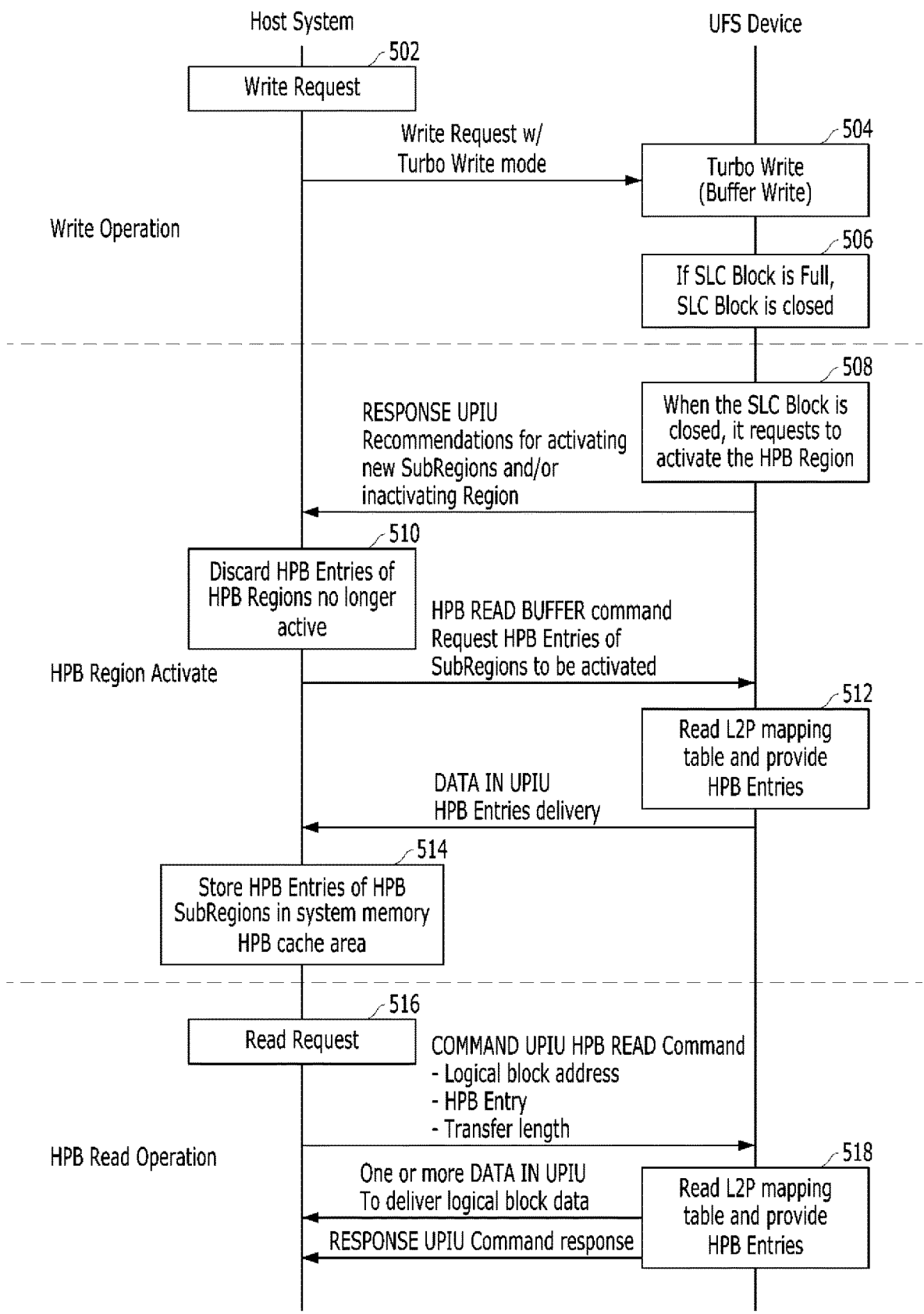
FIG. 6 illustrates an embodiment of performing HPB data communication between a host and a memory system.

FIG. 6 illustrates an embodiment of performing HPB data communication between a host and a memory system in accordance with the embodiments described herein.

Referring to FIG. 6, three operations in a data processing system including a host system and a Universal Flash Storage (UFS) device are classified and described. The three operations may include a write operation, an operation of transmitting mapping information (HPB Region Activate), and a read operation with an HPB entry (HPB Read Operation).

First, referring to the write operation, the host system may generate a write request related to a data item that needs to be stored in the universal flash storage device (502). The host system transfers the write request and the data item to the universal flush storage device with a Turbo Write mode.

The universal flush storage device may perform a turbo write operation in response to the turbo write mode (504). The turbo write operation may include an operation of programming data in the write booster region 164 described with reference to FIG. 1.

According to an embodiment, when the host system transmits a write request and a data item with a general write mode rather than a turbo write mode, the universal flush storage (UFS) device does not use the write booster region 164 but the user data region 166 (e.g., refer to FIG. 9) for programming the data item. The operation of programming data in the write booster region 164 may be completed in a faster time than the operation of programming data in the user data region 166.

When the turbo write mode is not requested, the memory system 110 may program a data item in the user data region 166 including a memory block, the memory block including a memory cell storing a multi-bit data item. When the host system transmits a write request in the turbo write mode, the universal flush storage (UFS) device may program a data item corresponding to the write request into the write booster region 164 to complete the write operation in a shorter time than the general write mode.

The memory block in the write booster region 164 in the universal flush storage device is set to store a single-bit data item in each memory cell therein (e.g., SLC block). When a data item input with the turbo write mode is programmed in a memory block included in the write booster region 164, the memory block can become from an open state to a closed state when data items are full in the corresponding memory block (506).

As described in FIG. 1, when the memory block in the write booster region 164 is closed, the universal flush storage device may assign the corresponding memory block to the HPB region 162 (508). The universal flush storage device may notify the host system that the memory block is added to the HPB region 162, before transmitting mapping information regarding data items stored in the memory block set as the HPB region 162. An indication that the memory block is newly assigned to the HPB region 162 may be inserted in a signal (e.g., a response signal) transmitted and received according to a protocol (e.g., UPIU) set between the host system and the universal flush storage device. Also, when a specific memory block is released from the HPB region 162, the universal flush storage device may transmit, to the host system, an indication that the specific memory block has been released from the HPB region 162.

When the host system receives the indication from the universal flush storage device that a specific memory block has been set in the HPB region 162, it can reserve a space for storing mapping information related to the corresponding memory block in the host memory 106 (e.g., shown in FIG. 1). According to an embodiment, the host system may delete, or release, some mapping information already stored in the host memory 106 that has not been used for a long time (510). In addition, when the universal flush storage device transmits the indication that a specific memory block has been released from the HPB region 162, the host system may delete, or release, mapping information associated with the corresponding memory block.

As described above, after the host system secures a space for storing new mapping information in the host memory 106, the host system can transmit, to the universal flush storage device, a request for obtaining the mapping information (HPB Entries) associated with the memory block newly assigned to the HPB region 162. The universal flush storage device can collect mapping information (e.g., Logi-cal to Physical (L2P) map information) that links a logical address associated with a data item stored in the memory block set as the HPB region 162 to a physical address, in response to a host request regarding the mapping information. The universal flush storage device can configure the mapping information (HPB Entries) for transmission to the host system (512).

Thereafter, the universal flush storage device may transmit configured mapping information (HPB Entries) in response to a host request from the host system. The host system may store the mapping information (HPB Entries) transmitted from the universal flush storage device in a space (HPB cache area) of the host memory 106 that has been secured in advance (514).

The host system may generate a read request for reading a data item stored in the universal flush storage device (516). The host system may check mapping information (HPB Entries) stored in an HPB cache area of the host memory 106. If mapping information (HPB Entries) associated with a logical address is stored in the host memory 106, the host system may transmit the logical address and the mapping information (HPB Entry) corresponding to the logical address to the universal flush storage device together with the read request. According to an embodiment, the host system may transmit information regarding a length of consecutive data items (Transfer Length) along with the read request.

After receiving the read request, the universal flush storage device can perform a read operation corresponding to the read request (518), and then can transmit a data item corresponding to the logical address transmitted along with the read request to the host system. The universal flush storage device can recognize mapping information (Logical to Physical (L2P) mapping information) for linking the logical address to the physical address from the mapping information (HPB Entry) delivered along with the read request, and can perform the read operation based on recognized mapping information.

If the mapping information (HPB entry) transmitted along with the read request from the host system is valid, the universal flush storage device can omit an operation for address translation or loading the mapping information from the memory device for the address translation, so that the read operation can be done faster by an amount of time for omitted operation. The universal flush storage device may transmit a data item corresponding to the read request to the host system. Then, the universal flush storage device may transmit, to the host system, a response signal indicating that the read request has been completed.

Figure 7:
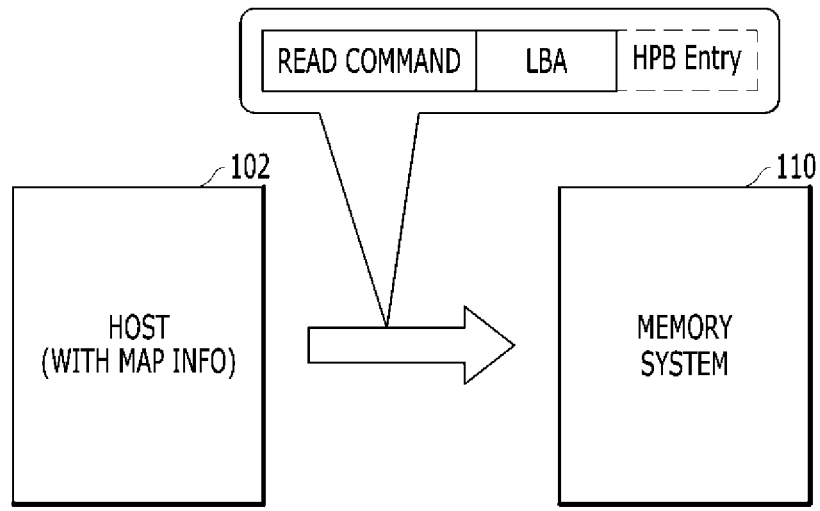
FIG. 7 illustrates an embodiment of a transaction between a host and a memory system.

FIG. 7 illustrates an example of a transaction that may be performed between a host and a memory system in a data processing system as described herein.

Referring to FIG. 7, the host 102 may store the map information (MAP INFO) and may transmit a read command including a logical address LBA and an HPB entry (HPB Entry) to the memory system 110. The host 102 can recognize a physical address PBA associated with the logical address LBA based on the mapping information (MAP INFO.) transmitted from the memory system 110, so that the HPB entry (HPB Entry) can include the physical address PBA associated with the logical address LBA. When a physical address PBA corresponding to a logical address LBA, transmitted to the memory system 110 with a read command (READ COMMAND), is found in the map information stored in the host 102, the host 102 can transmit the read command (READ COMMAND) to the memory system 110. The read command (READ COMMAND) may be transmitted with the logical address LBA and the HPB entry (HPB Entry).

When the physical address PBA corresponding to the logical address LBA, transmitted with the read command (READ COMMAND), is not found in the map information stored by the host 102, the host 102 may transmit the only read command (READ COMMAND), including the logical address LBA, to the memory system 110 without the HPB entry (HPB Entry).

Although FIG. 6 describes an operation in response to the read command (READ COMMAND) as an example, an embodiment can be applied to a write command or an erase command transferred from the host 102 to the memory system 110.

Figure 8:
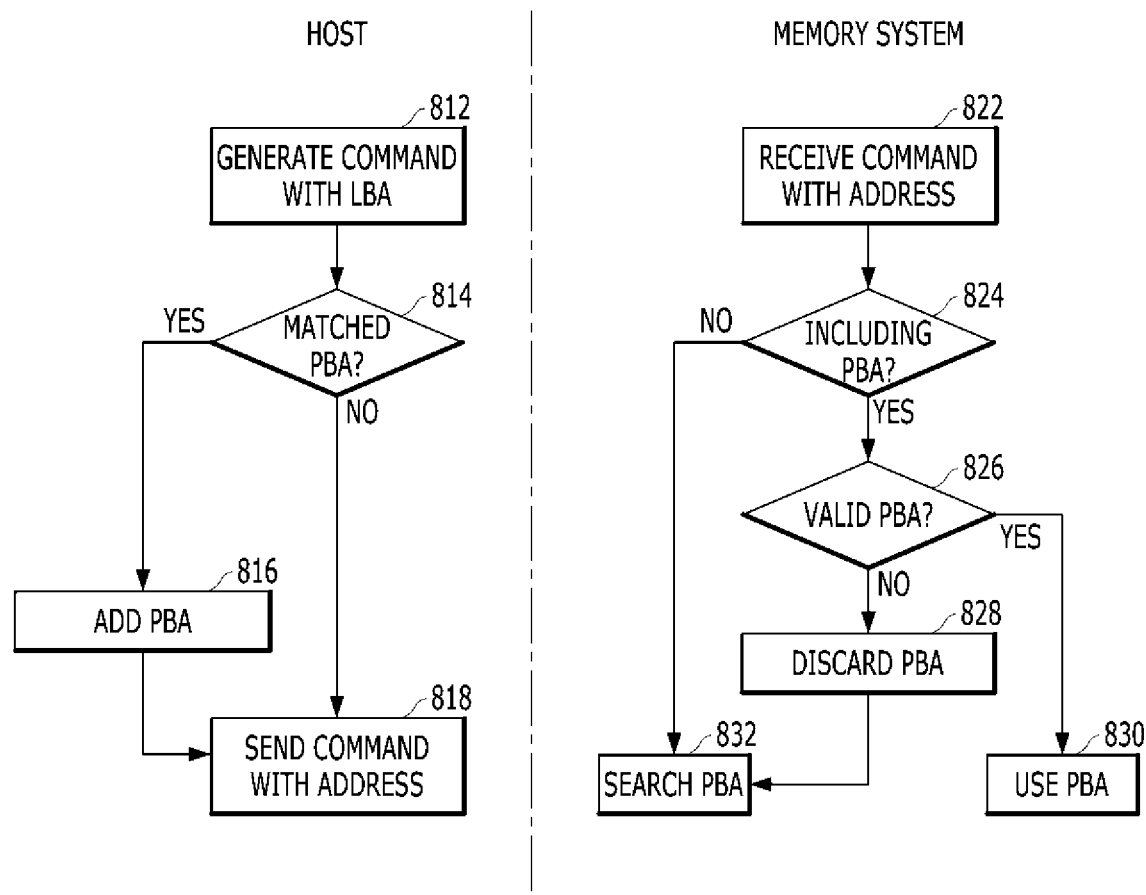
FIG. 8 illustrates an embodiment of a method of operating a host and a memory system.

FIG. 8 describes example operations of a host and a memory system based on an embodiment. FIG. 8 illustrates detailed operations of the host transmitting a command including a logical address LBA and a physical address PBA and the memory system receiving the command with the logical address LBA and the physical address PBA. The operations shown in FIG. 8 can be performed, for example, by the host 102 and the memory system 110 as shown in FIG. 7.

Referring to FIG. 8, the host may generate a command COMMAND including a logical address LBA (812). Thereafter, the host may check whether a physical address PBA corresponding to the logical address LBA is in the map information (814). If there is no physical address PBA (NO, in 814), the host may transmit a command COMMAND including the logical address LBA without the physical address PBA (818).

On the other hand, if there is the physical address PBA (YES, in 814), the host may add the physical address PBA to the command COMMAND including the logical address LBA (816). The host may transmit the command COMMAND including the logical address LBA and the physical address PBA (818).

The memory system may receive a command which is transmitted from an external device such as the host (822). The memory system may check whether the command is provided with a physical address PBA (824). When the command does not include a physical address PBA (NO, in 824), the memory system may perform a mapping operation or an address translation, e.g., search for a physical address corresponding to the logical address input with the command (832).

When the command includes the physical address PBA (YES, in 824), the memory system may check whether the physical address PBA is valid (826). The validity of the physical address PBA is checked to avoid using the physical address PBA that is not valid. The host may perform the mapping operation based on the map information delivered from the memory system. After performing the mapping operation, the host may transmit the command with the physical address PBA to the memory system.

In some cases, after the memory system transmits map information to the host, there may be some changes or updates on the map information managed or controlled by the memory system. In this case, the map information which has been delivered to the host before such changes or updates is not valid any longer, the physical address PBA obtained based on such old map information and delivered from the host is not valid either and cannot be used to access data.

Thus, determining the validity of the physical address may correspond to determining whether any changes or updates have occurred on map information used for the address translation to obtain the physical address PBA. When the physical address PBA provided with the command is valid (YES, in 826), the memory system may perform an operation corresponding to the command using the physical address PBA (830).

When the physical address PBA provided with the command is not valid (NO, in 826), the memory system may ignore the physical address PBA provided with the command (828). In this case, the memory system may search for a physical address PBA based on the logical address LBA input with the command (832).

FIG. 9 illustrates an embodiment of the memory device 150, which, for example, can include three regions. The three regions may include a write booster region 164, an HPB region 162, and a user data region 166. According to an embodiment, the write booster region 164, the HPB region 162, and the user data region 166 may be adjusted, for example, based on an internal configuration or performance of the memory device 150. Settings of the write booster region 164, the HPB region 162, and the user data region 166 may be made in a unit of memory block. According to an embodiment, the write booster region 164, HPB region 162 and user data region 166 may be individually established for each plane or each die in memory device 150.

The memory block in the memory device 150 may include a plurality of memory cells, with each memory cell capable of storing a multi-bit data item. However, a memory cell in the memory block may store a multi-bit data item or a single-bit data item according to a purpose and a setting. The write booster region 164 may be established to improve performance of the write operation performed within the memory system 110. An operation of programming a data item in the write booster region 164 can be done faster than an operation of programming a data item in the user data region 166. A data item stored in the write booster region 164 may be moved to the user data region 166, later.

The HPB region 162 may be related to mapping information transmitted from the memory system 110 to the host 102. The memory system 110 may set some memory blocks in the memory device 150 as the HPB region 162 and transmit, to the host 102, mapping information regarding data items stored in the memory block set as the HPB region 162. Referring to FIGS. 1 and 6, when a memory block set as the write booster region 164 is closed, the corresponding memory block may be assigned to the HPB region 162.

According to an embodiment, a memory block in the user data region 166 may be assigned to the HPB region 162 when the memory block stores a hot data item (e.g., a frequently accessed (read or programmed) data item). When garbage collection is performed on a memory block set as the write booster region 164, the corresponding memory block may be released from the HPB region 162. In addition, according to an embodiment, if a data item stored in a memory block among the memory blocks included in the write booster region 164 or the user data region 166 has been not accessed or read for a long time, the corresponding memory block is released from the HPB region 162.

Figure 10:
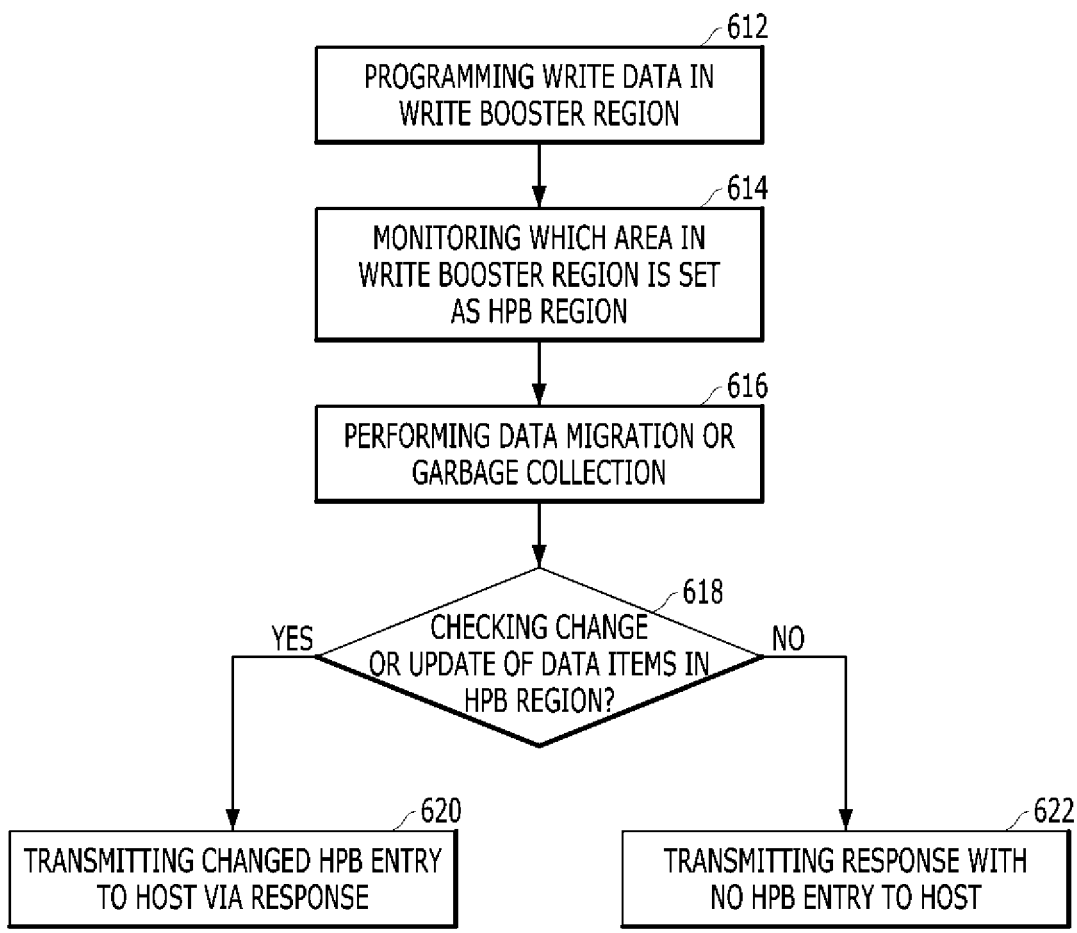
FIG. 10 illustrates an embodiment of a method of operating a memory system.

FIG. 10 illustrates an embodiment of a method of operating a memory system.

Referring to FIG. 10, the method of operating a memory system 110 can include programming write data items in a write booster region 164 (operation 612), monitoring which area in the write booster region 164 is set as a HPB region 162 (operation 614), performing data migration or garbage collection (operation 616), and checking change or update of data items included in the HPB region 162 (operation 618).

When at least some of data items included in the HPB region 162 is moved or migrated to another location of the memory device 150, the method of operating the memory system 110 can include transmitting at least one changed HPB entry to a host 102 via a response (operation 620). Herein, the changed HPB entry can include a map data item associated with a data item of which a physical location (e.g., a physical address) is changed or updated according to the data migration, the garbage collection, or the like.

However, when there are no data items moved or migrated from the HPB region 162 to another location of the memory device 150, the method of operating the memory system 110 can include transmitting the response with no HPB entry to the host 102 (operation 622).

Referring to FIG. 9, a memory block which is set as the write booster region 164 and the HPB region 162 can be released from the write booster region 164 and the HPB region 162 when all valid data items stored in the corresponding memory block is migrated or moved to another memory block. The corresponding block could be released from the write booster region 164 and the HPB region 162, so that the corresponding block can be considered a free block. However, according to an embodiment, even though a data item included in the HPB region 162 is migrated or moved to another location, it might be very likely that the data item is frequently accessed (e.g., read) by the host 102 after migrated or moved. Thus, the memory system 110 can transmit the map data item associated with the data item migrated or moved to the host 102, and then the host 120 can update the metadata 166 stored in the host memory 106 based on the map data item transmitted from the memory system 110. Accordingly, the host 102 can transmit a command (e.g., a read command) along with a valid physical address to the memory system 110.

The map data item can be transmitted via the response associated with the data migration, the garbage collection, or the like. The memory system 110 can perform the data migration, the garbage collection, or the like, in response to a command or a request input from the host 102. After completing the data migration, the garbage collection, or the like, the memory system 110 can transmit the response with status information (e.g., pass, success, failure, ready, or etc.) to the host 102. The memory system 110 can insert the map data item associated with the data item migrated or moved into the response.

Further, according to another embodiment, even though the host 102 does not have transmitted a command or a request for the garbage collection, the memory system can perform the garbage collection. In this case, the memory system could send a notification with the status information to the host 102 after completing the data migration. The memory system 110 can insert the map data item associated with the data item migrated or moved into the notification.

Figure 11:
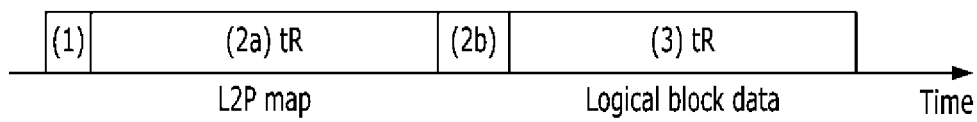
FIG. 11 illustrates an example of the performance of a memory system according to an embodiment.
Figure 11:
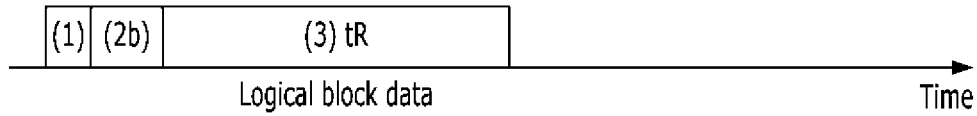
Figure 11:
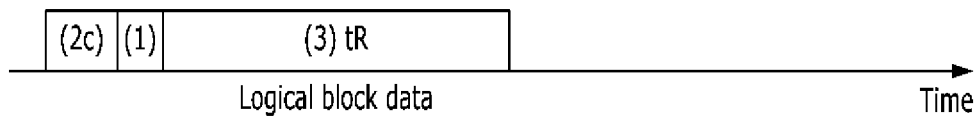

FIG. 11 shows an example of the performance of the memory system in the data processing system in accordance with the embodiments described herein. In the example of FIG. 11, three read operation cases are compared in a view of an amount of time for completing a read operation.

Referring to FIG. 11, the controller 130 in the memory system 110 may utilize a cache memory for temporarily storing mapping information. The cache memory may be a space, for example, in the memory 144 of FIGS. 1 to 3. The read operation performed in the memory system 110 can be classified into three cases: a first case when mapping information corresponding to the logical address input along with a read request is stored or loaded in the cache memory (L2P cache hit), a second case when the mapping information is not stored or loaded in the cache memory (L2P cache miss), and a third case when the host transmits the mapping information which is valid (HPB L2P cache hit).

First, when the mapping information corresponding to the logical address transmitted along with the read request is not in the cache memory (L2P cache miss), an operation margin of the read operation performed in the data processing system can include a first time through a fourth time. The first time may be for receiving and recognizing the read request (1). The second time may be for reading the mapping information stored in the memory device 150 and for storing the mapping information in the cache memory (2a). The third time may be for finding a physical address corresponding to the logical address based on the mapping information stored in the cache memory (2b). The fourth time may be for reading a data item from the memory device 150 based on the physical address (3).

When the mapping information corresponding to the logical address that is input with the read request exists in the cache memory (L2P cache hit), the operation margin of the read operation performed in the data processing system can include the first time for receiving and recognizing the read request (1), the third time for finding a physical address corresponding to the logical address based on the mapping information stored in the cache memory (2b), and the fourth time for reading a data item from the memory device 150 based on the physical address (3). When the mapping information is stored or loaded in the cache memory, the second time for reading the mapping information associated with the logical address from the memory device 150 would be not necessary.

In addition, when the host transmits the mapping information (HPB L2P cache hit) with the read request to the memory system, the operation margin of the read operation performed in the data processing system can include a fifth time taken for the host 102 to find the mapping information, which is associated with the logical address to be transmitted along with the read request, in the host memory 106 (2c). The operation margin may also include the first time for receiving and recognizing the read request and the mapping information (1) and the fourth time for reading a data item from the memory device 150 based on the physical address in the mapping information (3).

In this case, the fifth time for the host 102 to find the mapping information associated with the logical address (to be transmitted with the read request in the host memory 106 (2c)) is not spent on an internal operation of the memory system 110. In addition, when receiving and recognizing a read request, the memory system 110 may recognize the mapping information input along with the read request. Accordingly, the amount of time spent in the memory system 110 to execute a read command may be reduced, as compared to the two other cases (L2P cache miss, L2P cache hit) described above (e.g., whether the mapping information associated with the logical address is in the cache memory or not).

In accordance with one or more of the above-described embodiments, a memory system can be provided with increased reliability of data input/output operations. Further, a memory system can have plural regions allocated for different purposes regarding data input/output operations, so that the memory system can easily determine which data item(s) is(are) transmitted to the host, as well as which region the controller access first for performing a read operation. In one or more embodiments, a memory system may be provided which can effectively use a memory region in a host as a cache memory by transmitting, to the host, metadata which could be utilized more frequently by the host.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one embodiment, the logic recited in the claims may correspond to any one or combination of the features described herein that perform the recited operations of the logic.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

What is claimed is:

1. A memory system, comprising:
a memory device including memory blocks, each memory block including a memory cell capable of storing a multi-bit data item, wherein the memory device includes a write booster region including at least one memory block among the memory blocks, the at least one memory block including a memory cell storing a single-bit data item; and
a controller configured to assign a first memory block in the write booster region to a host performance booster (HPB) region when the first memory block is closed, and to transmit, to a host, an indication that the first memory block is assigned to the HPB region, wherein the HPB region is associated with storing, in the host, mapping information of the memory device.

2. The memory system according to claim 1, wherein the controller is further configured to transmit map data to the host in response to a request, the map data associated with a data item stored in the first memory block assigned to the HPB region.

3. The memory system according to claim 2, wherein:
the controller is configured to include a logical-to-physical (L2P) map data item into the map data, the L2P map data item used in translating a logical address of a valid data item, stored in the memory block, into a physical address.

4. The memory system according to claim 2, wherein:
when the request associated with the map data is input from the host, the controller is configured to include a logical-to-physical (L2P) map data item into the map data, the L2P map data item used in translating a logical address, associated with a valid data item to be outputted in response to a read request, into a physical address.

5. The memory system according to claim 1, wherein:
the controller is configured to perform data migration when there is no data input/output operation corresponding to a request from the host,
the data migration including storing a single-bit data item, temporarily stored in a second memory block included in the write booster region, to a third memory block, which stores a multi-bit data item per a memory cell, among the memory blocks in the memory device, wherein the second memory block is the least frequently or recently used memory block in the write booster region.

6. The memory system according to claim 5, wherein the controller is configured to release the second memory block from the write booster region when the data migration for all single-bit valid data items stored in the second memory block is successfully completed.

7. The memory system according to claim 6, wherein the controller is configured to transmit, to the host, an indication that the second memory block is released from the HPB region.

8. The memory system according to claim 5, wherein the controller is further configured to:
after completing the data migration, add a map data item, which is associated with a data item migrated or moved by the data migration, into a response or a notification; and transmit the response or the notification to the host.

9. The memory system according to claim 2, wherein, when a read request, associated with the map data, is input from the host, the controller is configured to search for a data item, corresponding to the read request, in a memory block of the HPB region earlier than another ones of the memory blocks.

10. A method for operating a memory system including a memory device, the memory device including memory blocks including a memory cell capable of storing a multi-bit data item, the memory blocks including at least one memory block, which is assigned to a write booster region and includes a memory cell storing a single-bit data item, the method comprising:
receiving a write request and a write data item from a host;
programming the write data item in a memory block included in the write booster region;
closing the memory block and assigning the memory block in the write booster region to a host performance booster (HPB) region, when the memory block is closed; and
transmitting, to the host, an indication that the memory block is assigned to the HPB region, wherein the HPB region is associated with storing, in the host, mapping information of the memory device.

11. The method according to claim 10, further comprising:
transmitting map data to the host in response to a request, wherein the map data corresponds to a data item stored in the memory block assigned to the HPB region.

12. The method according to claim 11, further comprising:
including a logical-to-physical (L2P) map data item in the map data, the L2P map data item used in translating a logical address of a valid data item, stored in the memory block, into a physical address.

13. The method according to claim 11, further comprising:
when the memory system receives the request from the host, including a logical-to-physical (L2P) map data item in the map data, the L2P map data item to be used in translating a logical address, associated with a valid data item to be outputted in response to a read request, into a physical address.

14. The method according to claim 13, further comprising:
while there is no data input/output operation corresponding to a request input from the host,
performing data migration to store the single-bit data item, temporarily stored in a first memory block included in the write booster region, to a second memory block, which stores a multi-bit data item per a memory cell, among the memory blocks in the memory device, wherein the first memory block is the least frequently or recently used memory block in the write booster region.

15. The method according to claim 14, further comprising:
releasing the first memory block from the write booster region when the data migration for all single-bit valid data items stored in the first memory block is successfully completed.

16. The method according to claim 15, further comprising:
after completing the data migration, adding a map data item, which is associated with a data item migrated or moved by the data migration, into a response or a notification; and
transmitting the response or the notification to the host.

17. The method according to claim 14, further comprising:
transmitting, to the host, an indication the first memory block is released from the HPB region.

18. A controller which is coupled via at least one data path to a memory device including memory blocks, each memory block including memory cells, each memory cell capable of storing a multi-bit data item, the controller including at least one processor, at least one memory, and logic, at least a portion of the logic comprised in hardware and executed by the at least one processor, the logic to:
receive a write request and a write data item from a host;
program the write data item in a write booster region of the memory device, wherein the write booster region includes at least one memory block among the memory blocks, the at least one memory block including a memory cell storing a single-bit data item;
assign a first memory block included in the write booster region to a host performance booster (HPB) region when the first memory block is closed; and
transmit, to the host, an indication that the first memory block is assigned to the HPB region, wherein the HPB region is associated with storing, in the host, mapping information of the memory device.

19. The controller according to claim 18, wherein the logic is configured to transmit map data to the host in response to a request input from the host, the map data associated with a data item stored in the first memory block assigned to the HPB region.

20. The controller according to claim 18, wherein the logic is configured to perform data migration while there is no data input/output operation corresponding to a request input from the host,
the data migration including storing the single-bit data item, temporarily stored in a second memory block included in the write booster region, to a third memory block, which stores a multi-bit data item per a memory cell, among the memory blocks in the memory device, wherein the second memory block is the least frequently or recently used memory block in the write booster region.

* * * * *